United States Patent [19]

Månsson

[11] Patent Number: 5,331,804
[45] Date of Patent: Jul. 26, 1994

[54] SYSTEM FOR STARTING A POWER PLANT

[75] Inventor: Martin Månsson, Finspong, Sweden

[73] Assignee: ABB Carbon AB, Finspong, Sweden

[21] Appl. No.: 66,112

[22] PCT Filed: Dec. 4, 1991

[86] PCT No.: PCT/SE91/00827
§ 371 Date: Jun. 4, 1993
§ 102(e) Date: Jun. 4, 1993

[87] PCT Pub. No.: WO92/10655
PCT Pub. Date: Jun. 25, 1992

[30] Foreign Application Priority Data

Dec. 5, 1990 [SE] Sweden ................. 9003866

[51] Int. Cl.$^5$ ............................................. F02C 7/26
[52] U.S. Cl. ............................. 60/39.02; 60/39.142
[58] Field of Search ........... 60/39.141, 39.142, 39.464, 60/39.821, 39.826, 39.02

[56] References Cited

U.S. PATENT DOCUMENTS

| | | | |
|---|---|---|---|
| 2,227,666 | 1/1941 | Noack | 60/39.142 |
| 3,093,968 | 6/1963 | Osofsky | 60/39.141 |
| 4,161,102 | 7/1979 | Jasas et al. | 60/39.826 |
| 4,299,087 | 11/1981 | Kullendorff | 60/39.142 |
| 4,600,414 | 7/1986 | Metcalfe et al. | 60/39.464 |
| 4,947,641 | 8/1990 | Rodgers | 60/39.142 |

FOREIGN PATENT DOCUMENTS 2018964 10/1979 United Kingdom .

Primary Examiner—Louis J. Casaregola
Attorney, Agent, or Firm—Pollock, Vande Sande & Priddy

[57] ABSTRACT

The present invention comprises an apparatus in a power plant having a combustion chamber for combustion of a fuel at overpressure, a turbine driven by generated combustion gases, a compressor driven by the turbine for compression of combustion air, a generator driven by the turbine and a gas conduit for transfer of combustion gases from the combustion chamber to the turbine, the apparatus including at least two start-up combustors located radially around the gas conduit, the start-up combustors being supplied upon the start-up with fuel and with combustion air from the compressor which in turn is rotated by the generator switched into motor operation. The start-up combustors deliver combustion gases to the turbine which, in turn, supplies power to the compressor.

4 Claims, 2 Drawing Sheets

SYSTEM FOR STARTING A POWER PLANT

TECHNICAL FIELD

The present invention relates to a device in a power plant comprising a combustion chamber for combustion of a fuel at overpressure, a turbine driven by generated combustion gases, a compressor driven by the turbine for compression of combustion air, a generator driven by the gas turbine, as well as a gas conduit for transferring combustion gases from the combustion chamber to the turbine.

BACKGROUND OF THE INVENTION

A plant of the above-mentioned type is described in Swedish patent specification 8700960-1 (456 757; corresponding to EP 881012041 (0 285 825) and U.S. Pat. No. 4,860,535). In such a plant the plant is started by the generator therein being switched to a motor, which accelerates the gas turbine of the plant to full, synchronous speed. This requires energy from the network, and limits the applicability to relatively small plants, for example with a gas turbine power of 15-17 MW.

Starting equipment for a larger plant of the above-mentioned type would become very extensive, both from the points of view of design and economy, and it is desired not to take out such great power for starting as would be required from the network in case of generator-motor start.

SUMMARY OF THE INVENTION

The present invention aims to provide a solution to the above-mentioned and similar problems and it is characterized in that the device in a power plant includes at least one start-up combustor and in that the generator can be switched to motor operation with a relatively low power, 5-10% of about the generator power, for rotation of the compressor upon start-up, the compressor supplying combustion air to the start-up combustor, and that fuel, for example oil, is transferred to the start-up combustor and burnt, the start-up combustor in turn delivering gases to the turbine, the turbine power thus being supplied to the compressor. By use of such a device, also large plants of the kind referred to here can be started up without any major power output from the network.

BRIEF DESCRIPTION OF THE DRAWINGS

The invention will be described in greater detail with reference to the accompanying drawings, wherein.

DESCRIPTION OF THE PREFERRED EMBODIMENT

Figure 2:
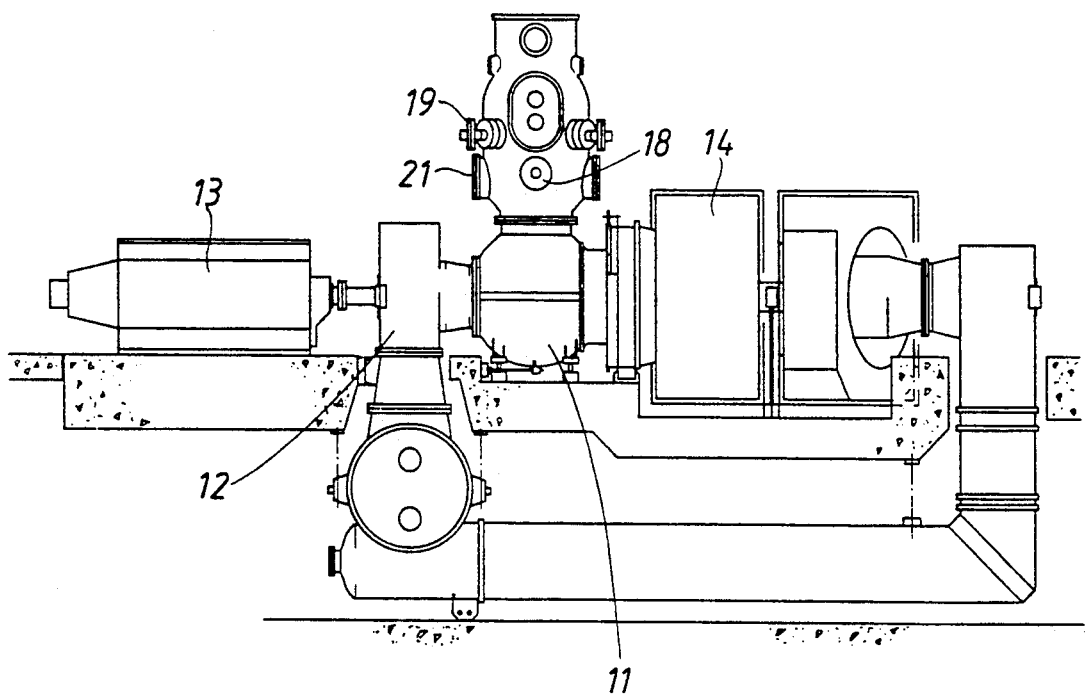
FIG. 2 is a view of the gas turbine with a generator.

FIG. 2 shows a gas turbine unit according to the invention, comprising a turbine 11, a compressor 12 and a generator 13 which may also serve as a starting motor. The gas outlet 14 from the turbine 11 is connected through a conduit to a waste heat boiler (not shown), in which the residual heat in the gases leaving the turbine 11 is utilized.

The combustion gases from a boiler are passed in a conduit 15 to the turbine 11 (see arrow F in FIG. 1), which drives the compressor 12 and the generator 13 (FIG. 2). Air compressed in the compressor 12 is passed in the conduit 16 to the boiler. The valve unit includes cut-off valves 17 and 20 which are operated by operating devices (see below). The conduit 16 includes at least one by-pass (short-circuit) valve 18 and at least one air valve 21 (see below).

Figure 1:
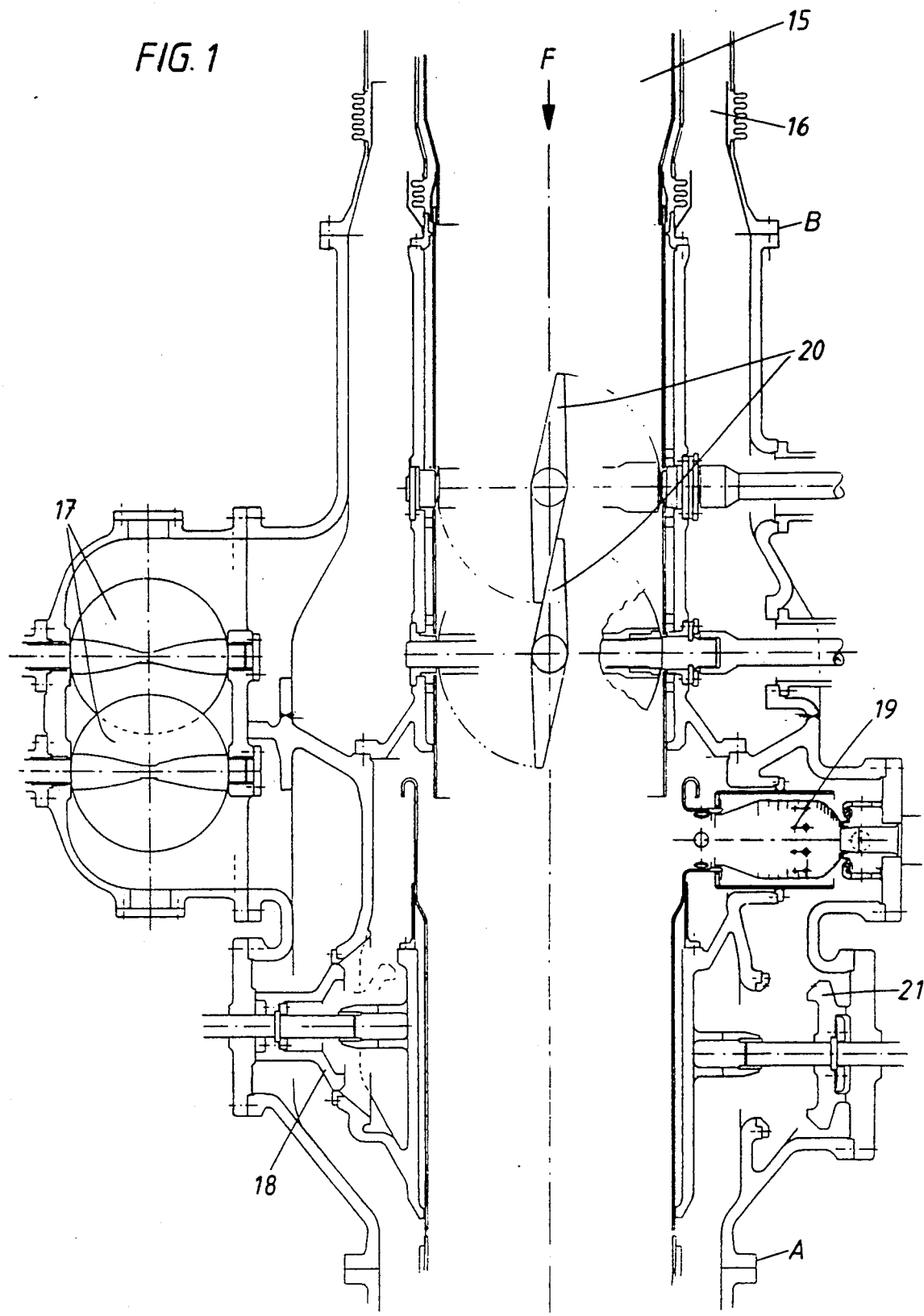
FIG. 1 shows parts of the power plant with a start-up combustor.

By valve unit is meant the unit between the flange A and the flange B in FIG. 1.

FIG. 1 shows, besides the combustion gas conduit 15 and the air conduit 16, cut-off valves 17 for the compressor air, in this case of butterfly type, for switching on and off the air from the compressor 12 to the boiler, the cut-off valves being suitably operated by operating (servo) devices (not shown). The by-pass valve 18 is intended to conduct the compressor air directly to the turbine. The valve 21 controls the air supply to the start-up combustor 19 upon start-up.

The start-up combustor 19, which may be one or more in number (see also FIG. 2 where a plurality, for example six, are arranged radially with respect to the gas conduit 15), is arranged at the combustion gas conduit 15 or at a separate location (not shown). It is supplied with air from the compressor when the valve 21 is in the shown position, and fuel, for example oil, is also supplied to the start-up combustor 19.

With the valves 17, 18 and 20 shut and the valve 21 open, the generator 13 is now switched in as motor for operation of the compressor 12.

The starting cycle is initiated by passing combustion air via the open valve 21 to the start-up combustor 19, to which also oil, for example, is supplied and ignited. Upon start-up, the start-up combustor 19 delivers combustion gases to the turbine 11, whereby power from the turbine is supplied to the compressor 12, and the compressor in turn delivers an increasing quantity of air to the start-up combustor, which supplies an increasing quantity of hot gas to the turbine. In this way, the gas turbine can accelerate until it reaches idling speed and later on synchronous speed.

After this, pressurization and heating of the pressure vessel of the total plant can be performed by successively opening the valves 17 and 20.

The invention can be varied in many ways within the scope of the following claims.

I claim:

1. An apparatus in a power plant having a combustion chamber for combustion of a fuel at overpressure, a turbine driven by generated combustion gases, a compressor driven by the turbine for compression of combustion air, a generator driven by the turbine and a gas conduit for transfer of combustion gases from the combustion chamber to the turbine, apparatus including:

at least two start-up combustors located radially around the gas conduit, said start-up combustors being supplied upon the start-up, with fuel and with combustion air from the compressor which in turn is rotated by the generator switched into motor operation, said start-up combustors delivering combustion gases to the turbine which supplies power to the compressor.

2. A method of starting up a large power plant including a combustion chamber for combustion of a fuel at overpressure, a turbine driven by generated combustion gases, a compressor driven by the turbine for compressor of combustion air, a generator driven by the turbine and a gas conduit for transfer of combustion gases from the combustion chamber to the turbine, said method comprising the steps of:

a) providing a plurality of start-up combustors radially around the gas conduit and connecting said start-up combustors to said gas conduit;
b) switching said generator into motor operation for rotating the compressor;
c) supplying fuel and combustion air from said compressor to said start-up combustors;
d) delivering combustion gases from said start-up combustors to said turbine, which, in turn, supplies power to said compressor, thereby starting said large power plant with low power output from power network.

3. An apparatus according to claim 1, wherein the start-up combustors are connected to said gas conduit.

4. An apparatus according to claim 1, wherein said apparatus includes at least one valve for switching on and off combustion air from the compressor to the start-up combustors.

* * * * *

UNITED STATES PATENT AND TRADEMARK OFFICE
CERTIFICATE OF CORRECTION

PATENT NO. : 5,331,804
DATED : July 26, 1994
INVENTOR(S) : Martin Mansson

It is certified that error appears in the above-indentified patent and that said Letters Patent is hereby corrected as shown below:

Column 2,
Claim 1, line 7, please add --said-- before "apparatus".

Signed and Sealed this

Third Day of January, 1995

*Attest:*

BRUCE LEHMAN

*Attesting Officer*     *Commissioner of Patents and Trademarks*